(12) United States Patent
Steinmetz et al.

(10) Patent No.: US 6,198,081 B1
(45) Date of Patent: Mar. 6, 2001

(54) WELDING SLEEVE OF THERMOPLASTIC MATERIAL WITH INDICATOR

(75) Inventors: Hans Werner Steinmetz, Schaffhausen (CH); Alfred Messmer, Tengen (DE); Dirk Alexander Petry, Feuerthalen (CH)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 732 days.

(21) Appl. No.: 08/490,046

(22) Filed: Jun. 13, 1995

(30) Foreign Application Priority Data

Jun. 13, 1994 (CH) .................................................. 01854/94

(51) Int. Cl.⁷ .................................................... B29C 65/34
(52) U.S. Cl. ........................ 219/535; 219/544; 156/304.2; 285/21.2
(58) Field of Search .................................. 219/535, 544, 219/548, 534; 285/21–22; 156/257, 268, 275.1, 380.1, 380.7, 304.2

(56) References Cited

U.S. PATENT DOCUMENTS

| 4,117,311 | * | 9/1978 | Sturm | 219/535 |
| 4,313,053 | * | 1/1982 | Sturm | 219/535 |
| 4,375,591 | * | 3/1983 | Sturm | 219/535 |
| 4,626,308 | * | 12/1986 | Ansell | 219/535 |
| 4,703,150 | * | 10/1987 | Kunnecke et al. | 219/535 |
| 5,116,082 | * | 5/1992 | Handa et la. | 219/535 |

* cited by examiner

*Primary Examiner*—John A. Jeffery
(74) *Attorney, Agent, or Firm*—Bachman & LaPointe, P.C.

(57) ABSTRACT

A shaped part formed as a welding sleeve, consisting of thermoplastic material with a resistance wire winding arranged on its inner circumference, having at least one weld indicator. The indicator consists of a stem which is formed from the material of the body of the shaped part or sleeve. The stem prevents the material which comes under increased pressure upon the welding operation, and is urged towards the surface of the sleeve, from passing into the free space, by the resting against a corresponding surface of the sleeve recess.

5 Claims, 1 Drawing Sheet

WELDING SLEEVE OF THERMOPLASTIC MATERIAL WITH INDICATOR

BACKGROUND OF THE INVENTION

The present invention relates to a shaped part of a thermoplastic material, such as described in the preamble to claim 1.

Such a shaped part developed as weld socket is known from Federal Republic of Germany C2-27 60 064. In that case, the weld indicator consists of a sensing pin arranged in a cylindrical free space in the body of the socket, said pin being essentially cylindrical and having a tip which is flush with the outer periphery before its deformation as a result of the welding.

The base of the sensing pin is arranged on the bottom of the free space close to the electric resistance heating wire. This weld indicator has the disadvantage that, upon the melting of the thin wall of the body of the socket in the region of the free space, the wall can be broken through and the melted thermoplastic material can escape from the free space. As a result of these melt movements, short circuits may occur and thus local overheating and burning of material.

SUMMARY OF THE INVENTION

The object of the present invention is to provide a shaped part having a weld indicator of the aforementioned type in which such an indication of successful welding is given without emergence of the thermoplastic material and which can be produced without additional parts, at the same time as the production of the shaped part, for instance by injection shaped part.

In accordance with the invention, this object is achieved by the features set forth in claim 1.

Particularly advantageous developments of the invention are set forth in the dependent claims.

BRIEF DESCRIPTION OF THE DRAWINGS

A preferred embodiment of the invention will be described in further detail with reference to the accompanying drawing, in which.

DETAILED DESCRIPTION

Figure 1:
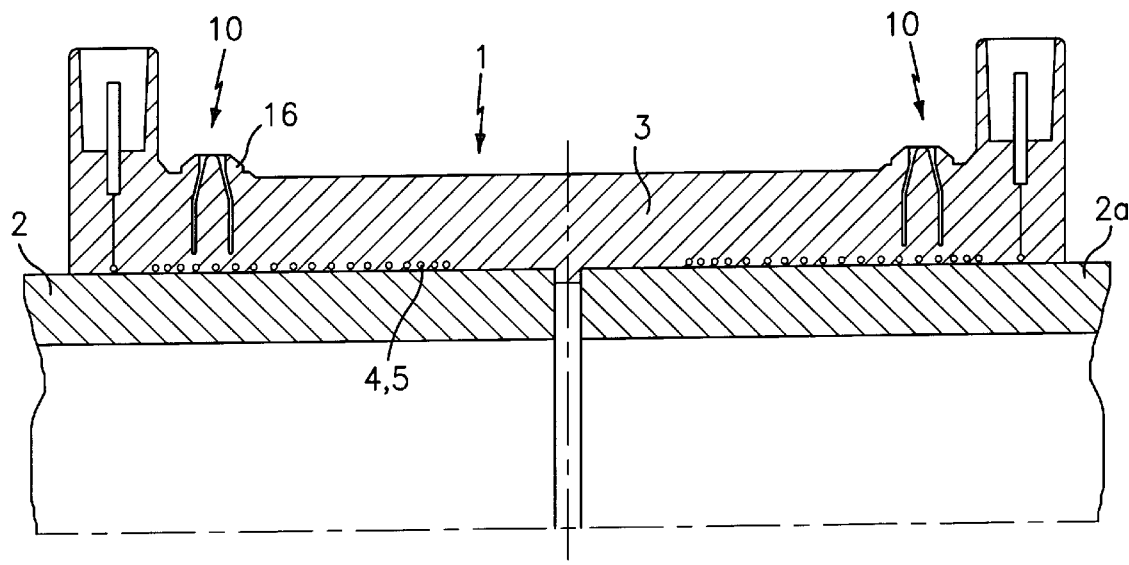
FIG. 1 is a longitudinal section through a shaped part developed as welding socket.

FIG. 1 shows a shaped part developed as welding sleeve 1 for connecting conduit elements such as ends of pipelines 2 and 2a of a thermoplastic material. A shaped article or sleeve body 3 has, in the vicinity of its inner wall or directly thereon, a heating element 4 which consists of a spirally wound resistance wire 5 the ends of which extend out of the shaped body 3 for connection to a device having a source of current or are connected to a plug contact.

Figure 2:
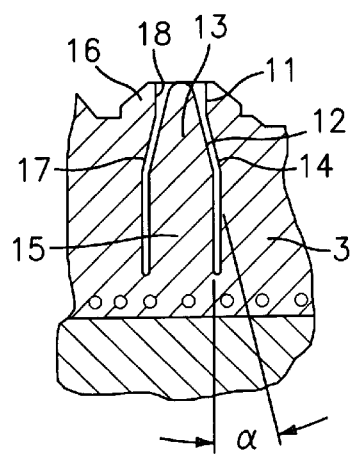
FIG. 2 is an enlarged portion of FIG. 1 before welding.
Figure 3:
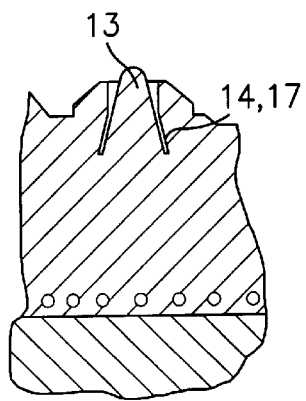
FIG. 3 shows the section shown in FIG. 2 after welding.

At both ends of the welding region of the shaped part a weld indicator 10 is arranged. As can be noted from FIGS. 2 and 3, the weld indicator 10 has a body or stem 13 which is formed from the material of the shaped article or sleeve body 3.

In the region of its base, the stem 13 is anchored to the body of the shaped part and has a portion which extends towards the outside in a conically tapered manner. The stem 13 is preferably formed, at least in part, as a circular cone with a rounded end. The region 11 of the shaped part 3 which surrounds the stem 13 is stepped and has a corresponding conical resting surface 14, which then passes in the direction of the outer contour of the sleeve body 3 into a cylindrical part 18. The angle of inclination a of the conical portion of the stem 13 and of the resting surface 14 is preferably between 10° and 20°. The angle is advantageous for the removal of the shaped part from the mold on production of the shaped part by injection so that the undercut region 11 can still be removed from the mold without permanent deformation.

An annular bead 16 can advantageously be arranged on the outer contour of the sleeve body 3 around the region 11, as a result of which the removal of the undercut region 11 from the mold is facilitated.

Between the stem 13 and the inner wall of the region 11, thin walls extending lengthwise to the stem are formed whereby the valve body 13 is held in guided manner. Two or more, and preferably three, such walls can be present.

By way of the weld indicator 10 in accordance with the invention, thermoplastic material, which is melted during the welding process and is under increased pressure, is prevented from forcing its way outward into the free space 12. By the forcing out of the stem 13 during the welding, the conical surfaces 17 of the stem are pressed against the conical resting surface 14 of the region 11 (see FIG. 3) and, as a result, a barrier is produced against the emergence of molten thermoplastic material and the necessary welding pressure for dependable welding can build up as a result of the expanding of the plastic. The aforementioned melt movements do not occur. The tip of the stem 13 which extends beyond the outer contour of the sleeve body 3 indicates that welding has been effected.

The stroke of the stem 13 is established by the width of slot between the conical resting surface 14 of the region 11 and the conical surface 17 of the stem 13, and it should be sufficient so that good optical perception of the protruding tip of the stem 13 is assured.

In order that the possible sliding back of the stem 13 into the recess is prevented upon the cooling of the thermoplastic material after the welding, the region 11 can be provided with an annular bead (not shown) which engages in an annular groove (not shown) in the outwardly propelled 13, as a result of which the latter is held in its pressed-out position.

The arrangement described can also be provided on welding portions of saddle parts, for instance in connection with spot-drilling or branching shaped parts or on welding portions of other shaped parts.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A shaped part of thermoplastic material comprising a sleeve body provided with a heating element comprising a resistance wire for producing a weld connection, said sleeve body having provided therein indicator means to indicate when a weld joint has been made, said indicator means comprises at least one stem of thermoplastic material formed integral with said sleeve body and located within a stepped recess, said stepped recess prevents molten thermoplastic material which comes under increased pressure during welding from flowing to a peripheral surface on the sleeve body due to the stem coming to rest against a corresponding surface of the stepped recess of the shaped part.

2. A shaped part according to claim 1 wherein the stem has a conical surface at least over a portion of its length.

3. A shaped part according to claim 1 wherein the stem is formed at least in part as a cone having a rounded end.

4. A shaped part according to claim 2 wherein the stepped recess has a conical surface which mates with the conical surface of the stem to prevent flow of molten material to the surface.

5. A shaped part according to claim 4 wherein the conical surfaces of the stem and recess have an angle of inclination ($\alpha$) of between 10° and 20°.

* * * * *